United States Patent [19]

Annus

[11] 4,425,761
[45] Jan. 17, 1984

[54] TURBOCHARGED DIESEL ENGINE WITH THROTTLED REGULATION

[75] Inventor: Imre Annus, Budapest, Hungary

[73] Assignee: Autóipari Kutató Intézet, Budapest, Hungary

[21] Appl. No.: 279,266

[22] Filed: Jul. 1, 1981

Related U.S. Application Data

[63] Continuation of Ser. No. 51,968, Jun. 25, 1979, abandoned.

[30] Foreign Application Priority Data

Jun. 26, 1978 [GB] United Kingdom ............... 27881/78

[51] Int. Cl.³ .......................................... F02B 37/12
[52] U.S. Cl. ..................................................... 60/611
[58] Field of Search ........................ 60/600, 601, 611; 123/564

[56] References Cited

U.S. PATENT DOCUMENTS

| 3,044,683 | 7/1962 | Woollenweber | 60/600 X |
|---|---|---|---|
| 3,196,606 | 7/1965 | Cholvin et al. | 60/611 |
| 3,208,213 | 9/1965 | Anderson | 60/611 |
| 3,796,048 | 3/1974 | Annus et al. | 60/598 |
| 3,913,542 | 10/1975 | Uitti et al. | 60/611 X |

FOREIGN PATENT DOCUMENTS

| 622488 | 6/1961 | Canada | 123/564 |
|---|---|---|---|
| 2362133 | 6/1975 | Fed. Rep. of Germany | 60/602 |
| 458350 | 12/1936 | United Kingdom | 123/564 |

OTHER PUBLICATIONS

"P. & W. Develops Automatic Power and Mixture Control for Aircraft Engines", Guy E. Beardsley, Jr. *Automotive Industries*, Jun. 1, 1935, pp. 726-731.

*Primary Examiner*—Michael Koczo
*Attorney, Agent, or Firm*—Karl F. Ross; Herbert Dubno

[57] ABSTRACT

In a turbocharged internal-combustion engine, especially a Diesel engine, the turbocharger air delivery is arranged to match the air demand of the engine at low r.p.m., with the suction duct of the turbocompressor being provided with a throttle valve actuated to prevent the permitted charging pressure from being exceeded at higher r.p.m. by means of a regulating valve responsive to the charging pressure of the turbocompressor the actuation threshold of which is set to the permitted nominal supercharging pressure.

3 Claims, 7 Drawing Figures

TURBOCHARGED DIESEL ENGINE WITH THROTTLED REGULATION

This is a continuation of application Ser. No. 051,968, filed June 25, 1979, now abandoned.

CROSS-REFERENCE TO RELATED APPLICATIONS

This application is related to my copending application Ser. No. 177,596 filed Aug. 13, 1980 as a continuation in part of Ser. No. 165,963 filed July 7, 1980 as a continuation of Ser. No. 864,236 filed Dec. 27, 1977 (abandoned) as a continuation in part of Ser. No. 855,340 filed Nov. 28, 1977 (abandoned). See also Ser. No. 089,247 filed Oct. 29, 1979.

FIELD OF THE INVENTION

The invention concerns a turbocharged Diesel engine wherein the turbocompressor provides maximum charging in the r.p.m. range below that associated with the maximum torque of the suction engine, while above that r.p.m. range a throttle valve arranged in the suction duct responds to the pressure of the charging air and prevents the turbocompressor from exceeding the permitted subercharging pressure.

BACKGROUND OF THE INVENTION

A known disadvantageous property of turbocharged Diesel engines is that the characteristics of the turbocompressor output are unfavorable to the air requirements of a piston engine both with respect to the engine itself and with respect to a machine unit driven by the exhaust turbine. The disadvantage is that at low engine r.p.m. the turbocharger air delivery is less than that required while in a higher r.p.m. range there is a risk of overcharging, and thus excessive heat stress (thermal load) of the engine owing to the air delivery being greater than that required. Because of the changing r.p.m. conditions in the operation of motor vehicles, these disadvantageous characteristics arise to a greater extent with them and there are attendant smoke and pollutant emission characteristics, especially on acceleration. Several known proposals have aimed at eliminating the above unfavorable properties of turbocharged engines.

In one known construction, upstream of the exhaust gas turbine, there is provided in the exhaust pipe a by-pass duct by-passing the gas turbine and closable by a valve which is controlled by a pressure sensor coupled to the pressure duct of the turbocompressor and which passes a portion of the exhaust gas into the by-pass duct whenever the charging pressure of the turbocompressor exceeds a predetermined value. But a difficulty with this apparatus is that a regulating valve is installed in the exhaust pipe which is subjected to high temperature and that the turbocharger cannot be operated at higher engine r.p.m. in the high-efficiency range of its characteristic and also that a part of the energy of the exhaust gas remains unutilized.

In another known construction the delivery duct of the turbocompressor is closable by valves and is connected with the section of the exhaust duct upstream of the turbine and thus part of the compressed air can be transferred to mix with the exhaust gases, e.g. for feeding one of the two turbines, setting of the valve is effected by a hand lever or automatically in dependence on engine r.p.m. This method can only be employed only for large engines partly because of the difficulty of handling and partly because of the use of two turbines.

Another construction that can be employed for large and relatively slowly operating engines involves two compressors on a common shaft. At low engine r.p.m. operation only one of the compressors is operative while the suction and delivery ducts of the other compressor are closed by a respective butterfly valve.

In yet another construction it is sought to improve the inadequate air delivery at low engine r.p.m. by connecting the delivery duct of the turbocompressor to terminate in a collecting or plenum tank connected to a resonance pipe with a resonance tank. The latter is in turn coupled to the short suction pipes of the engine cylinders, the suction periods of which do not overlap each other to any significant extent; the natural resonance frequency of the system is tuned to an engine r.p.m. which is so low as to assist in increasing the otherwise insufficient air output of the turbocharger. A limitation to the use of this method is defined by the size of the effective resonance range; also the dimensions of the apparatus are considerable and can frustrate its use, in certain cases, for vehicle engines.

OBJECT OF THE INVENTION

An object of the present invention is to provide a turbocharging apparatus that is well coordinated with a motor vehicle engine, the air delivery of which is better matched to the fresh air requirements of a piston engine, which is reliable, is of relatively simple construction and which enables motor vehicles to meet smoke emission standards. A further object of the invention is the better utilization over a larger range of engine r.p.m. of the possibilities of increasing torque, which are limited by the mechanical and thermal loads as well as the useful life of an internal-combustion engine.

SUMMARY OF THE INVENTION

The basic concept on which this invention rests is the use of a turbocharger which at low r.p.m., i.e. in the r.p.m. range below the maximum torque of the suction motor, delivers sufficient fresh air for supercharging—expediently by fully exploiting the motor until the permitted maximum peak combustion pressure is reached—and exceeding the permitted charging pressure is prevented by throttling the suction duct upstream of the turbocompressor so that the throttling valve, installed in the suction duct, is controlled by a sensing element responsive to the charging pressure of the turbocompressor.

The invention accordingly consists in a turbocharged engine, preferably a Diesel engine, wherein the air delivery or output of the turbocharger equals the fresh air requirement of the internal combustion engine at full load at or in the vicinity of one half of the nominal r.p.m. and at this r.p.m. range the pressure relationship or value of the turbocompressor approaches the permitted maximum supercharging pressure which is limited by the permitted peak pressure of combustion, while in the range of the nominal engine r.p.m. the air output of the turbocharger is greater by at most 10% than the fresh air requirement of the internal combustion engine, a throttle valve, disposed in the fresh air suction pipe upstream of the turbocompressor, the throttle valve being operatively connected to actuate a pressure-sensitive valve associated with the member of the fresh air system between the turbocompressor and the engine cylinders, the threshold value of the pressure-sensitive regulating valve being the adjusted permitted nominal supercharging pressure.

In a preferred embodiment of a Diesel engine according to the invention the pressure duct of the turbocompressor is connected to a collecting tank which is in turn connected by a resonance pipe to a resonance vessel to which are connected the suction ducts (or, a common suction manifold) of three or at most four cylinders, the suction periods of which do not overlap to any significant extent, and the resonance frequency of the fresh air system is tuned to the engine r.p.m. at which the peak combustion pressure does not reach the permitted value, without resonance charging.

A further preferred embodiment of the invention consists in a Diesel engine having a gasifier for passing a portion of the fuel into the fresh gas duct and arranged in the fresh air suction duct upstream of the entry cross-section of the turbocompressor, wherein the throttle valve of the gasifier has an actuating unit equipped with a sensing element for sensing the temperature of the fresh gas, disposed in a fresh gas duct connecting the turbocompressor with the engine cylinders, and also equipped with a pressure-sensing element associated with the same duct section, the actuation threshold value of which is the permitted supercharging pressure; the normal ambient temperature sensed by the temperature sensor being co-ordinated with the closed position of the throttle valve while increasing temmperatures being co-ordinated with valve settings of reduced throttling while a charging pressure exceeding the permitted value is co-ordinated with a setting of increased throttling by the throttle valve.

Preferred embodiments of the invention allow a smaller, lighter and less expensive turbocharger to be used, relative to currently known turbochargers, for a given internal-combustion engine, wherein maximum torque can be achieved at no more than one-half of the nominal engine r.p.m., which torque can be held at an approximately constant value to about ¼ of the nominal engine r.p.m. The economical operation of the engine is affected to a negligible extent only by the fact that in the range of nominal output or r.p.m.—in contrast to the general trend and efforts—the engine is operated by throttling the suction duct.

A Diesel engine having a throttle valve arranged in the fresh gas suction duct upstream of the turbocompressor is already known from Specification No. 1,280,616 of the Federal Republic of Germany. In this construction the throttle valve constitutes part of the gasifier that assists cold start of the engine and its operational setting depends on the fresh gas temperature prevailing in the pressure duct upstream of the turbocompressor. As soon as the temperature of the fresh gas reaches the operational temperature, the throttle valve is placed in this fully open setting and until the next cold start has no further operational role.

It is a remarkable consequence of effecting the permitted maximum charging at low engine r.p.m. that the work of charge change of the internal-combustion engine became positive at low r.p.m. within a wide range of r.p.m., whereby the efficiency of the engine is improved and consequently its torque is enhanced.

BRIEF DESCRIPTION OF THE DRAWING

A Diesel engine according to the invention is described below in the form of three preferred embodiments illustrated in the accompanying schematic drawings, wherein.

SPECIFIC DESCRIPTION

Throughout the drawings, like or functionally equivalent parts have been allotted like reference numbers.

Figure 1:
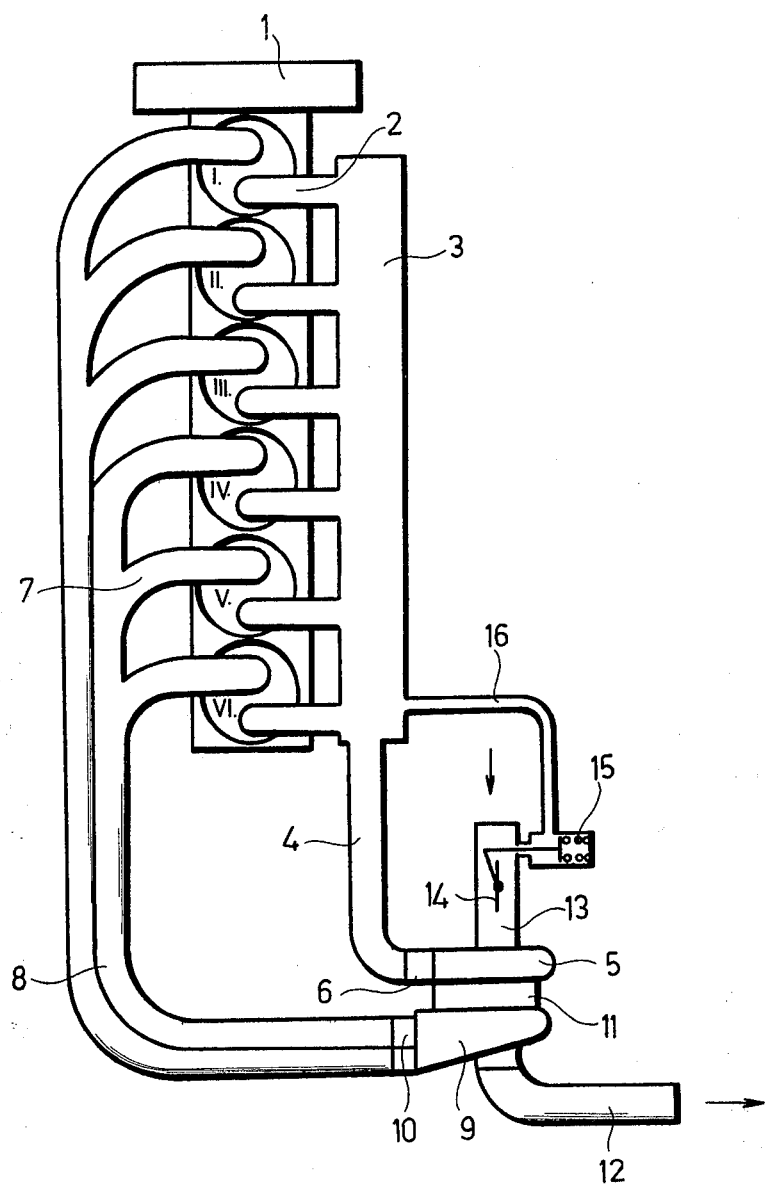
FIG. 1 is a plan view of a first embodiment of a turbocharged Diesel engine with six in-line cylinders.

Referring first to FIG. 1 of the drawings, there is shown as "in-line six" or "straight six" arrangement of cylinders of a Diesel engine.

The cylinders I–VI of the engine 1 are connected via suction inlet ducts 2 to a common fresh gas manifold 3 which latter is connected via a delivery pipe 4 to the pressure or delivery duct 6 of the turbocompressor 5.

The exhaust pipes 7 of the cylinders I–VI are all connected to an exhaust manifold 8 connected to the inlet pipe 10 of an exhaust gas turbine 9. The rotary parts of the turbocompressor 5 and the exhaust gas turbine 9 are mounted on a common shaft (not shown) and the two members 5, 9 constitute together a single turbocharger unit 11. A non-illustrated air filter is arranged upstream of the fresh air suction (inlet) duct 13 and an exhaust pipe 12 is connected to the exhaust outlet of the gas turbine 9.

A throttle valve 14 is arranged in the fresh air suction duct 13 and is operatively connected to a pressure-responsive regulating valve 15 which has a pressure-responsive element connected via a duct 16 to the common fresh gas manifold 3.

Figure 2:
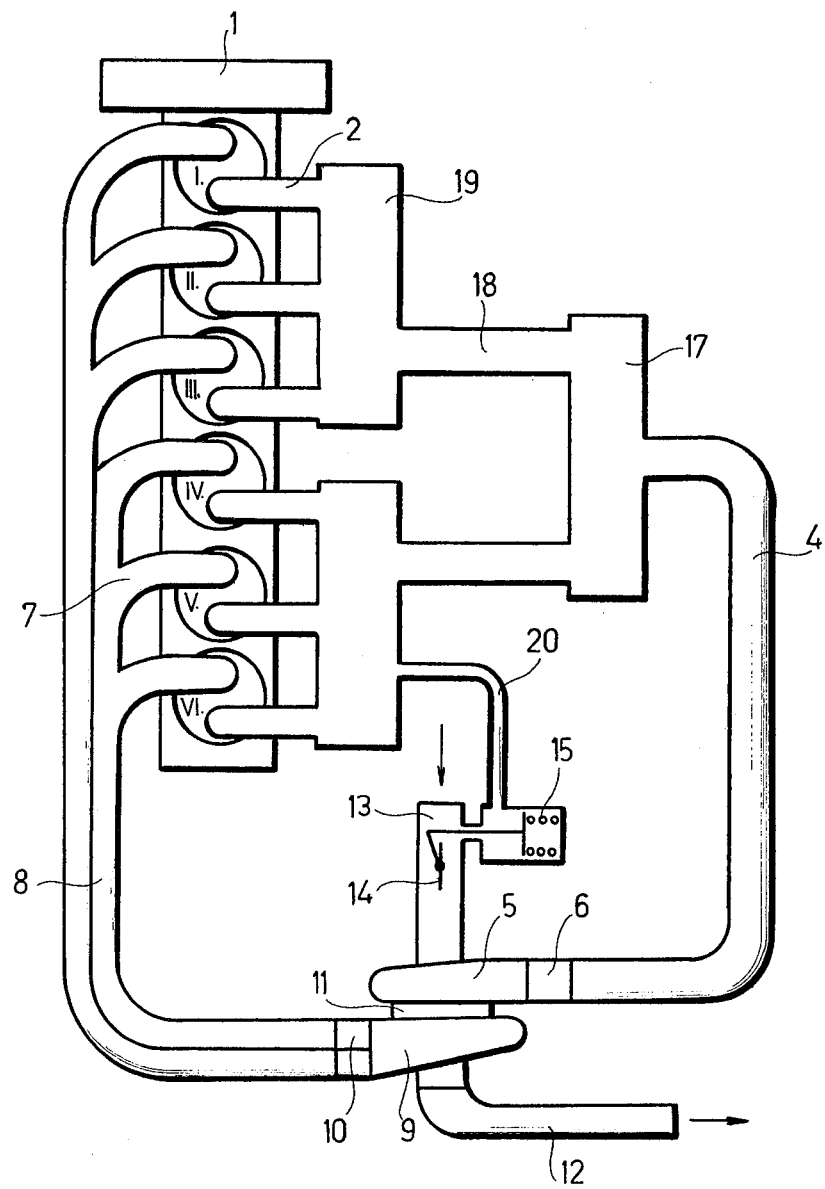
FIG. 2 is a view similar to FIG. 1 but showing a second preferred embodiment wherein the engine is additionally provided with suction duct charging and resonance vessels.

In the embodiment according to FIG. 2 the pressure-responsive regulating valve 15 is connected via a pipe 20 to a resonance chamber or vessel 19 common to and connected to the cylinders IV–VI. The cylinders I–III are also connected to a common resonance chamber or vessel 19. Both vessels 19 are connected to a common plenum or collecting tank 17 which is connected via the pressure duct 4 to the pressure duct 6 of the turbocompressor 5.

On full load the air delivery of the turbocharger 11 is equal to the air requirement of the engine 1 at or adjacent one-half of the nominal engine r.p.m. and the charging pressure of the turbocharger 11 does not result in peak pressure values exceeding the permitted maximum peak combustion pressure. This is one of the important characteristics of the turbocharger and it is manifest that this turbocharger 11 would deliver more air than permitted at nominal engine r.p.m. Another of its important characteristics is that its air delivery at nominal engine r.p.m. does not exceed the air requirements of the engine by more than 10%. Thus the turbocharger 11 may be smaller than turbochargers selected in the generally usual manner and its air delivery is only identical with the fresh air demand of the engine 1 in one r.p.m. range. The delivery of more than the permitted quantity of air is prevented by the throttling 14 employed in the suction duct 13 of the turbocompressor 5, the throttle valve 14 being controlled by the regulating valve 15 that senses and is responsive to the pressure prevailing in the pressure duct 4 downstream of the turbocompressor 5 and in the resonance chambers 19. For instance, in a motor vehicle fitted with the Diesel engine 1 and having a cylinder volume of 10 liters, the air delivery of the turbocharger at full load equals the fresh air demand of the engine at an engine r.p.m. of 1200 and at the nominal 2200 r.p.m. of the engine its air delivery exceeds the air requirements of the engine by 10%. It follows from the co-ordination of combination of the engine 1 and the turbocharger 11 that in the range of 1200 and 1600 r.p.m. the pressure relation of the turbocharger, i.e. the charging pressure does not exceed the permitted pressure value. Above 1600 r.p.m. the charging pressure-responsive valve 15 actuates the throttle valve 14 and displaces it to a setting of increased throttling, whereby the charging pressure is reduced to the permitted value.

Figure 3:
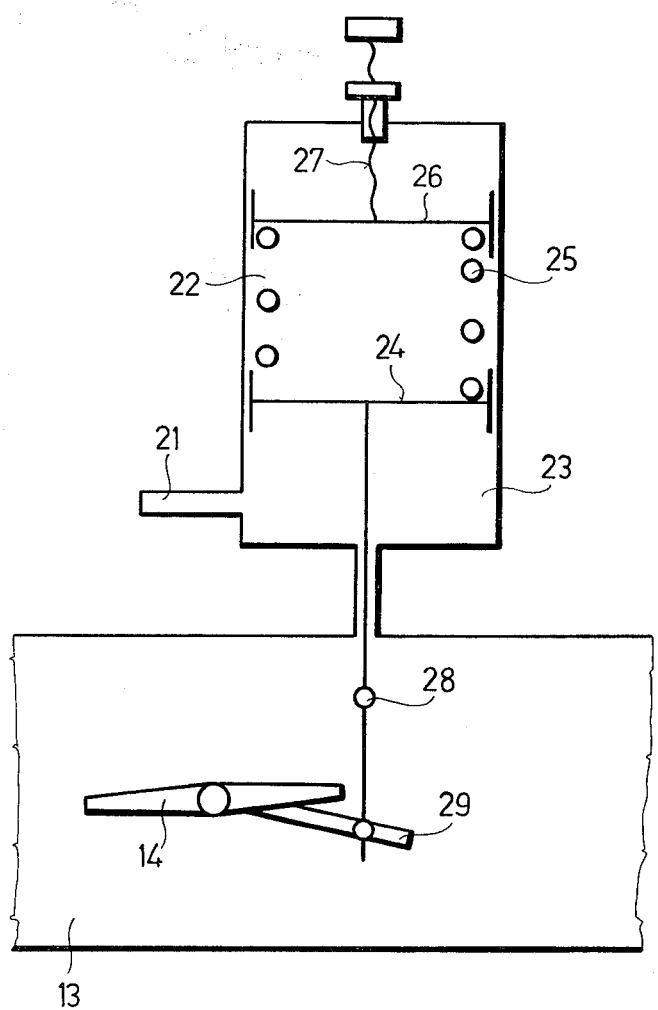
FIG. 3 is a sectional view on a larger scale of a throttle valve fitted in the suction duct of the turbocompressor and of a pressure-responsive regulating valve actuating the throttle valve.

FIG. 3 shows a simple mechanical construction for the pressure-responsive regulating valve 15 embodied in the invention, effective to sense the charging pressure and at the same time to actuate the throttle valve. A housing 22 has a chamber 23 subjected to charging pressure by virtue of being connected via a pipe 21 to the pressure duct indicated by the reference number 16 in FIG. 1 and the reference number 20 in FIG. 2. The chamber 23 has a displaceable wall constituted by a sensing piston 24 biased on its face remote from the chamber 23 by a compression spring 25. A prestressing adjustment screw 27 bears against a plate 26 of the spring 25 and its set to a predetermined prestressing force. The chamber 23 is always subjected to the same pressure as the charging pressure and the sensing piston 24 moves accordingly against the bias of the spring 25. The pressure-responsive regulating valve 15 is mounted in the fresh air suction duct 13 of the turbocompressor 5 and the piston rod 28 of the sensing piston 24 is directly connected to the arm 29 of the throttle valve 14 which in this example is constructed as a butterfly valve.

The embodiment according to FIG. 1 operates as follows; the turbocompressor 5 sucks fresh air in via the fresh air suction duct 13 and charges it via the delivery duct 4 to the fresh air manifold 3 from where the fresh air passes into the individual cylinders I–VI through the suction or inlet ducts 2. At full load the turbocompressor 5, i.e. the turbocharger 11 delivers at 1200 engine r.p.m. a quantity of air that is identical with the quantity of air required by the engine. Simultaneously with the increase in engine r.p.m. the quantity of air delivered by the turbocharger 11 also increases and so does the pressure ratio. At about 1600 r.p.m. of the engine the pressure ratio of the turbocompressor 5 approaches the permitted maximum charging pressure which is the threshold for actuation to which the pressure-responsive regulating valve 14 is set. The increasing charging pressure displaces the sensing piston 24 and thus the throttling valve 14 is displaced towards its closing position.

The throttle valve 14 causes a pressure drop upstream of the turbocompressor 5 whereby, at a pressure ratio which can be regarded as unchanged, the charging pressure on the delivery side of the turbocompressor 5 is reduced. Until the nominal engine r.p.m. is reached, the charging pressure increases only to the extent necessary for regulation and negligibly as far as operation of the engine is concerned. At the same time, despite the increasing throttling the delivered air volume increases in accordance with the engine air demand as a consequence of the increasing r.p.m. of the turbocharger 11.

The magnitude of the throttling is such that at nominal engine r.p.m. the quantity of air delivered by the turbocharger is reduced by about 10% compared with the state where no throttling is employed. By the air demand or requirement of the engine a quantity of air is meant which is sufficient to achieve the desired effective mean pressure, or a value close to the latter.

In general the maximum peak combustion pressure fails to reach the permitted value in the fully regulated range of engine r.p.m. The peak pressure curve as a function of engine r.p.m. may be rendered smoother or more uniform—and thus the effective mean pressure may be further increased—by using the resonance-charged fresh air system shown in FIG. 2, wherein in a manner known per se, the resonant frequency of the system can be tuned to that engine r.p.m. or range of r.p.m. at which the permitted peak pressure value could not be reached without it. In other respects the operation of the FIG. 2 embodiment agrees with that of the FIG. 1 embodiment.

Figure 4:
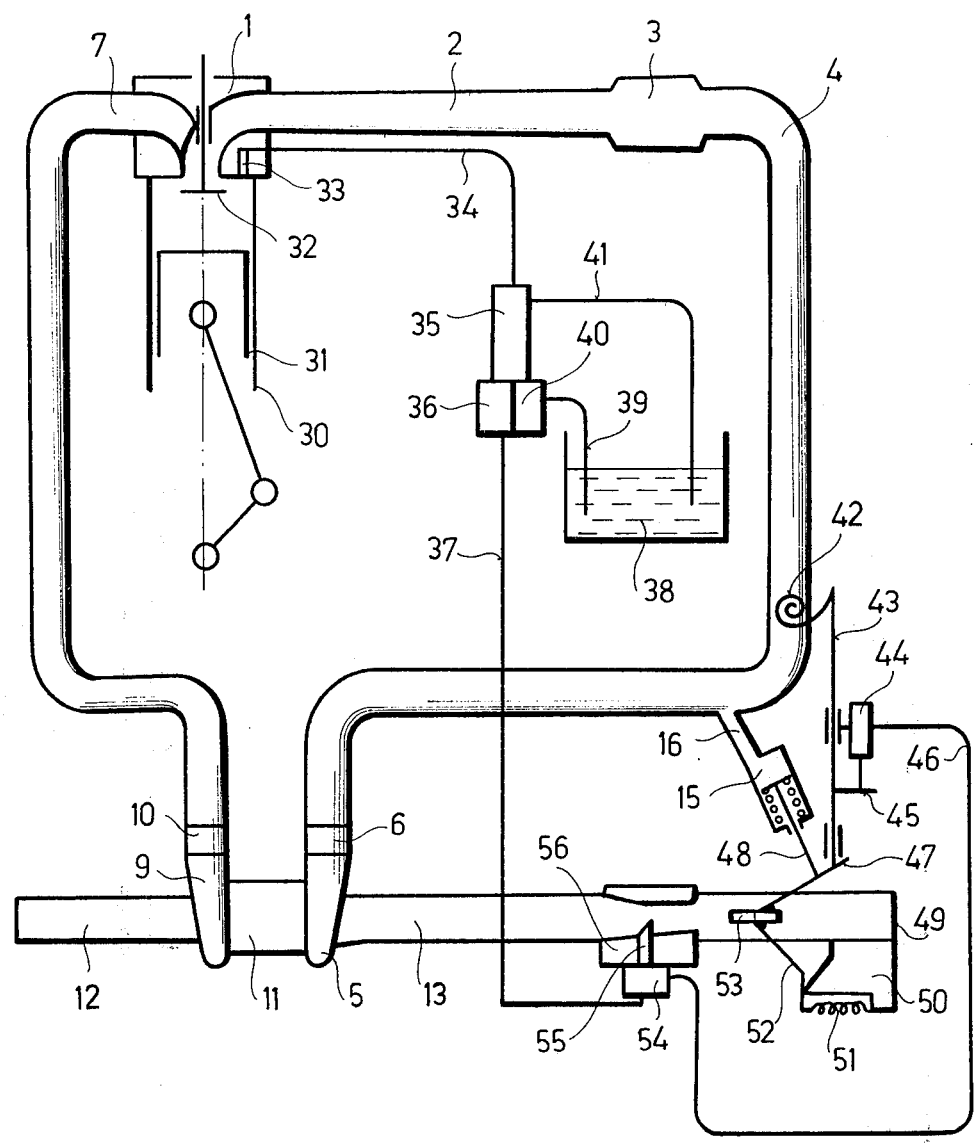
FIG. 4 is a view similar to FIG. 1 but illustrating a third preferred embodiment of a Diesel engine provided with a gasifier.

FIG. 4 schematically illustrates a Diesel engine equipped with a gasifier. The internal-combustion engine 1 has a cylinder 30 which is provided with a piston 31 and valve 32 to which an intake (suction) duct 2 and an outlet (exhaust) duct 7 are connected. The suction duct 2, the fresh air manifold 3 and the delivery duct 4 connect the engine cylinder 31 with the delivery duct 6 of the turbocompressor 5 of the turbocharger 11. The exhaust duct 7 and the exhaust manifold 8 connect the cylinder 31 with the inlet duct 10 of the exhaust gas turbine 9 which in turn is coupled to the exhaust pipe 12 leading to the ambient atmosphere. A fresh air duct 13 open to ambient air is coupled to the turbocompressor 5. A throttle valve 53 and a gasifier 56 are arranged in the section of the fresh air duct 13 located between the turbocompressor 5 and the entry opening 49.

The gasifier 56 has a nozzle 55 fitted with a shut-off tap 54 and is connected via a duct 37 to a feed pump 35 arranged to receive fuel via pipe 39 and a filter 40 from a fuel tank 38. The fuel tank 38 is also connected to the overflow pipe 41 of an injector pump 35 the delivery pipe 34 of which is connected to an atomizer 33 of the engine cylinder 30.

The arm 47 of a throttle valve 53 disposed between the gasifier 56 and the fresh air suction duct 13 is connected for mutually independent actuation to two different elements. One of these elements is the linkage 43 of a temperature-sensitive bimetallic spring 42 adapted to sense the temperature of fresh air delivered by the turbocompressor 5 or preferably arranged in the fresh air duct 4 of the fresh air ducting system that connects the cylinder 30 to the turbocompressor 5.

The other element is the push rod 48 of the pressure-responsive regulating valve 15 adapted to sense the pressure of fresh gas. The throttle valve 53 has an abutment arm 52 to which a spring 51 is hooked to tend to pull the arm against a stop 50.

The illustration is purely schematic and shows the position of the parts in the case of medium r.p.m. of a warmed-up engine.

An abutment 45 is formed on the linkage 43 of the bimetallic spring 42 and co-operates with a limit switch 44. A lead 46 transmits the signal from the limit switch 44 to the shut-off tap 54. In the basic position of the bimetallic spring 42 corresponding to normal ambient temperature the shut-off tap 54 is open, while in the position corresponding to the fresh gas temperature of a warmed-up engine the signal from the limit switch 44 keeps the shut-off tap 54 in a closed position so that when the engine has warmed-up the gasifier 56 is inoperative and no fuel can flow through the nozzle 55.

The embodiment according to FIG. 4 operates as follows. The illustrated four-stroke Diesel engine 1, its fuel injection pump 35 and its atomizer 33 operate in the known manner. The turbocharger 11 also operates in the known manner, its dimensions and working characteristics being selected similarly to the embodiment shown in FIG. 1. That is to say, the air delivery of the turbocharger 11 at full load is identical with the fresh air demand of the engine 1 at or in the vicinity of onehalf of the nominal engine r.p.m. while is greater than that by at most 10% in the range of the nominal engine r.p.m. In the rest condition of the internal-combustion engine 1 the temperature-sensitive bimetallic spring 42 keeps, via its linkage 43, the throttle valve 53 in its closed position, in which it is angularly displaced by nearly 90° from the illustrated position. The shut-off tap 54 is open and on start-up fuel is sucked from the nozzle 55 of the gasifier 56 to the cylinder 30 of the engine, while the injection pump 35 passes fuel directly into the cylinder via the atomizer 33. A portion of about 10% of the fuel passes through the gasifier 56 while the rest passes through the atomizer in a manner known per se, the aim being that the internal-combustion engine should be started up more reliably, its idling should be smoother and its partial load properties should be more favorable.

As the engine warms up the temperature of the fresh air in the delivery duct 4 downstream of the turbocompressor 5 increases. This is sensed by the bimetallic spring 42 which continuously opens the throttling valve 53 to its illustrated rest position. When the engine has fully warmed up and since the throttle valve 53 is in its illustrated position, as r.p.m. increases the pressure of the fresh air delivered by the turbocompressor 5, i.e. the charging pressure, reaches its maximum permitted value at $\frac{1}{2}$-$\frac{3}{4}$ of the nominal engine r.p.m.

The push rod 48 of the pressure-responsive valve 15 is displaced when the pressure exceeds the preset permitted charging pressure and moves the throttle valve 53 via the arm 47 to a setting of increased throttling whereby to throttle the suction side of the turbocompressor 5 and reduce the charging pressure of the fresh air. The pressure-responsive valve 15 and the bimetallic spring 42 actuate the throttle valve 53 mutually independently so that always that prevails from between the two actuating elements which provides for the greater throttling.

Two separate throttle valves may also be employed, respectively actuated by the charging pressure-responsive element and the temperature-responsive element.

The advantage of a Diesel engine according to preferred embodiments of the invention manifest themselves primarily in motor vehicle operation where engine r.p.m. changes frequently and where the smoke emission properties of the engine are of special significance. From the point of view of smoke emission the most critical condition for turbocharged Diesel engines is acceleration at full load. On acceleration the lag of the turbocharger with increasing engine r.p.m. increases the tendency to smoke emission. In the present invention, the r.p.m. of the turbocharger changes less than in known turbochargers and follows the change in engine r.p.m. on acceleration more closely, hence the air surplus factor of the engine is improved and smoking is reduced.

Figure 5:
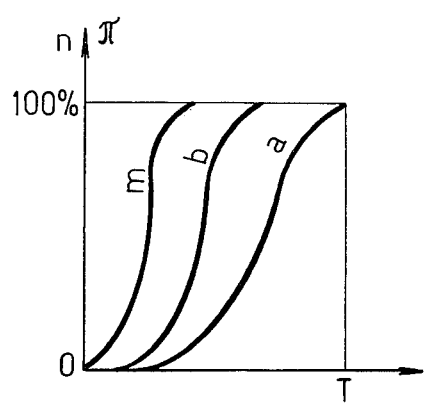
FIG. 5 illustrates the lag of turbochargers of differing characteristics, on acceleration.

The graph shown in FIG. 5 illustrated the change in the r.p.m. of the turbocharger on acceleration as a function of time, wherein "n" is the turbocharger r.p.m. as a % of the stationary operational condition and T is time. Curves "a", "b" and "m" respectively illustrate the charge in r.p.m. of: the turbocharger of a Diesel engine charged in the known manner, the turbocharger of the same Diesel engine charged in accordance with the present invention, and the Diesel engine itself.

Figure 6:
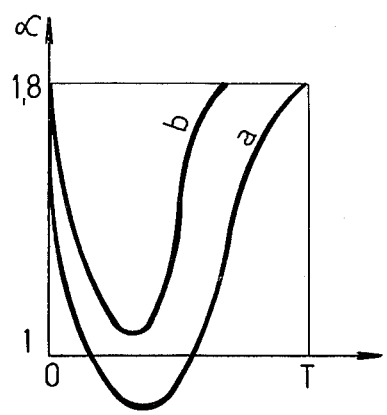
FIG. 6 illustrates the development of the air surplus factor produced by turbochargers of differing characteristics, on acceleration.

FIG. 6 illustrates graphically the change of the surplus air factor $\alpha$ as a function of time, employing the same reference letters as FIG. 5 and under the same change of engine r.p.m.

Figure 7:
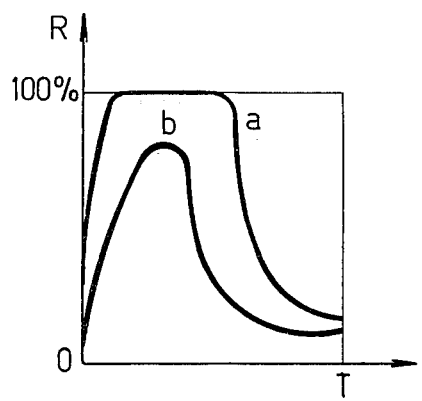
FIG. 7 illustrates the development of smoke emission caused by turbochargers of different characteristics, on acceleration.

FIG. 7 illustrates graphically the change of the smoke emission number R as a function of time, employing the same reference letters as FIG. 5.

In Diesel engines according to the invention intercooling of the air can be employed with advantage to enable a further increase in the engine torque, in a considerably higher engine r.p.m. range. The air cooler is expediently arranged between the inlet manifold of the cylinders and the air regulating valve.

I claim:

1. A turbocharged engine system, comprising:

a Diesel engine having a plurality of cylinders, an intake manifold connected with at least some of said cylinders, an exhaust manifold connected with all of said cylinders, an exhaust duct connected with said exhaust manifold, air-feed means connected with said intake manifold and constructed and arranged to deliver air to all of said cylinder, and a rated r.p.m.;

a turbocharger for said engine comprising a turbine connected to said exhaust duct and driven by all of the exhaust gas from said engine, and a compressor having an air outlet communicating with said air-feed means, and an air intake communicating with the atmosphere, said turbocharger being dimensioned, constructed and arranged to provide fully the fresh air requirement of said engine at full load and about half said rated r.p.m. with an air pressure approaching a maximum permissible supercharging pressure corresponding to permitted peak combustion pressure, said turbocharger further being constructed and arranged to have an air delivery greater by at most 10% than said fresh air requirement at said rated r.p.m.;

a throttle valve in said air intake having a shiftable member; and a pressure sensor responsive to the pressure in said intake manifold and connected to said member as a means for controlling same, said pressure sensor having a threshold pressure below which said throttle valve is fully open and above which said throttle valve is closed progressively with increasing pressure in said intake manifold, said threshold pressure corresponding to a preset nominal permissible supercharging pressure, said air intake being provided with a fuel gasifier between said throttle valve and said compressor, a temperature-sensing element disposed in said air-feed means, a spring biasing said throttle valve toward a fully open position, said pressure sensor operating against the effect of said spring, and means connecting said element to said throttle valve for displacing same against the force of said spring, the last-mentioned means and said pressure sensor being constructed and arranged to enable whichever of them provides the greatest throttling operative effect to be operative upon said throttle valve at any given time.

2. The system defined in claim 1 wherein said pressure sensor comprises a housing, a plate received in said housing, a screw threaded into said housing for establishing said threshold and acting upon said plate to displace same in said housing, a spring bearing against said plate, a piston engaged at one side by said spring and disposed in said housing, said piston being connected to said throttle valve, and duct means communicating between said intake manifold and the interior of said housing on the opposite side of said piston.

3. The system defined in claim 1 wherein said air-feed means includes a plenum chamber and said intake manifold communicates with at least three but not more than four cylinders and forms a resonance chamber, said plenum chamber being connected to said resonance chamber by a resonance pipe.

* * * * *